United States Patent
Sanno

(10) Patent No.: US 8,493,462 B2
(45) Date of Patent: Jul. 23, 2013

(54) IMAGE PROCESSING APPARATUS, PHOTOGRAPHING APPARATUS AND CONTROL METHOD FOR COMPRESSING IMAGES

(75) Inventor: Masato Sanno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 13/051,686

(22) Filed: Mar. 18, 2011

(65) Prior Publication Data
US 2011/0242343 A1    Oct. 6, 2011

(30) Foreign Application Priority Data
Apr. 5, 2010    (JP) .................................. 2010-086734

(51) Int. Cl.
| H04N 5/225 | (2006.01) |
| G06K 9/36 | (2006.01) |
| G06K 9/46 | (2006.01) |

(52) U.S. Cl.
USPC ...................................... 348/220.1; 382/239

(58) Field of Classification Search
None
See application file for complete search history.

(56) References Cited

U.S. PATENT DOCUMENTS

| 7,016,546 | B2 * | 3/2006 | Fukuhara et al. ............. 382/239 |
| 7,312,821 | B2 | 12/2007 | Voss et al. |
| 8,279,298 | B2 | 10/2012 | Fujii |
| 2004/0246344 | A1 * | 12/2004 | Voss et al. .................. 348/220.1 |
| 2006/0038888 | A1 * | 2/2006 | Kotouda .................. 348/211.14 |
| 2007/0274682 | A1 | 11/2007 | Mizushima et al. |
| 2009/0237519 | A1 * | 9/2009 | Fujii .......................... 348/220.1 |
| 2012/0321274 | A1 | 12/2012 | Fujii |

FOREIGN PATENT DOCUMENTS

| CN | 101079990 A | 11/2007 |
| CN | 101299801 A | 11/2008 |
| CN | 101540867 A | 9/2009 |
| EP | 1628486 A | 2/2006 |
| JP | 2000-050263 | 2/2000 |

\* cited by examiner

*Primary Examiner* — Albert Cutler
(74) *Attorney, Agent, or Firm* — Cowan, Liebowitz & Latman, P.C.

(57) ABSTRACT

In an image processing apparatus, a still image immediately before a moving image is photographed is divisionally encoded in correspondence to a slice area of the moving image, and a compression table of the slice area in one frame of the moving image is determined based on a compressed data amount of corresponding divisional encoding of the still image. Thus, the image processing apparatus determines the compression table for each slice area of the moving image so that constant compressed data amount for one entire frame of the moving image is attained without performing a trial compression.

8 Claims, 4 Drawing Sheets

FIG. 4A
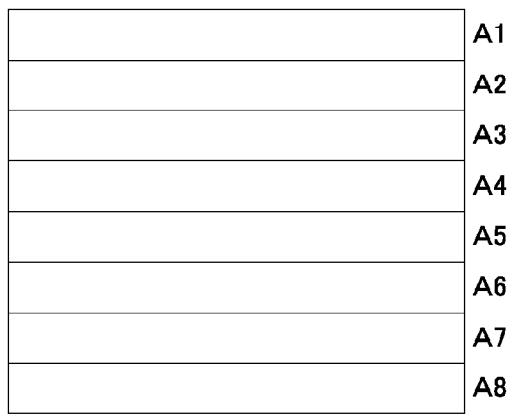
DIVIDED AREAS OF STILL IMAGE
FIG. 4B
SLICE AREAS OF MOVING IMAGE
FIG. 5
| COMPRESSION DATA RESULT | MOVING IMAGE COMPRESSION TABLE |
|---|---|
| $(a+b) < k \times 0.5$ | Q1 |
| $(a+b) < K \times 0.8$ | Q2 |
| $(a+b) < K \times 1.2$ | Q3 |
| $(a+b) < K \times 1.5$ | Q4 |
| $(a+b) > K \times 1.5$ | Q5 |

IMAGE PROCESSING APPARATUS, PHOTOGRAPHING APPARATUS AND CONTROL METHOD FOR COMPRESSING IMAGES

BACKGROUND OF THE INVENTION

1. Field of the Invention

The present invention relates to a method of deciding a compression table adapted to compress a moving image.

2. Description of the Related Art

In Japanese Patent Application Laid-Open No. 2000-050263, an image encoding apparatus having a compression table corresponding to a moving image and a still image has been disclosed. If such a compression table is used in a case where an object of a moving image is the same as that of a still (object) image, for example, in such a case where the still image is photographed during moving image photographing, or the like, compression of not only the moving image but also the still image can be attained with the same compression table. In an MPEG moving image, a compression table of one frame of the moving image can be determined on a sliced area basis. In the case of determining the compression table in order to set a compressed data amount to be constant with respect to one frame of the moving image, it is necessary to perform compression on a trial basis (test compression), so that a long processing time is required. If it is desired to obtain the compression table on the basis of a compression result of the still image photographed immediately before the moving image to be compressed to reduce the processing time, since the compression table of the still image is to be set to the whole of the image, it happens that an area of an image to which the compression table can be adapted in the still image differs from that in the MPEG moving image. Therefore, it is difficult to determine the optimized compression table in a short time to each sliced area of the MPEG moving image.

SUMMARY OF THE INVENTION

An aspect of the invention is to provide an image processing apparatus which is capable of solving the above-described problems of the related background art and provide an image processing apparatus. According to an aspect of the present invention, an image processing apparatus of the present invention is arranged such that a compression table of a moving image is obtained based on a compression result of a still image photographed immediately before, so that the compression table of the moving image per slice area can be determined in a short processing time without executing a test compression or the like. In addition, the image processing apparatus of the present invention is arranged to be capable of determining an optimized compression table for every slice area in one frame of the moving image, so that even in the case of an object such as an image that a high frequency component is partially contained in one frame of the moving image, a compressed data amount of one frame of the moving image can be set to be constant.

Further features of the present invention will become apparent from the following description of exemplary embodiments with reference to the attached drawings.

BRIEF DESCRIPTION OF THE DRAWINGS

FIGS. 4A and 4B are diagrams illustrating an example of divided areas of a still image and slice areas of a moving image according to the embodiment of the invention.

FIG. 5 is a diagram illustrating an example of a determining method of a moving image compression table according to the embodiment of the invention.

DESCRIPTION OF THE EMBODIMENTS

Preferred embodiments of the present invention will now be described in detail in accordance with the accompanying drawings.

Figure 1:
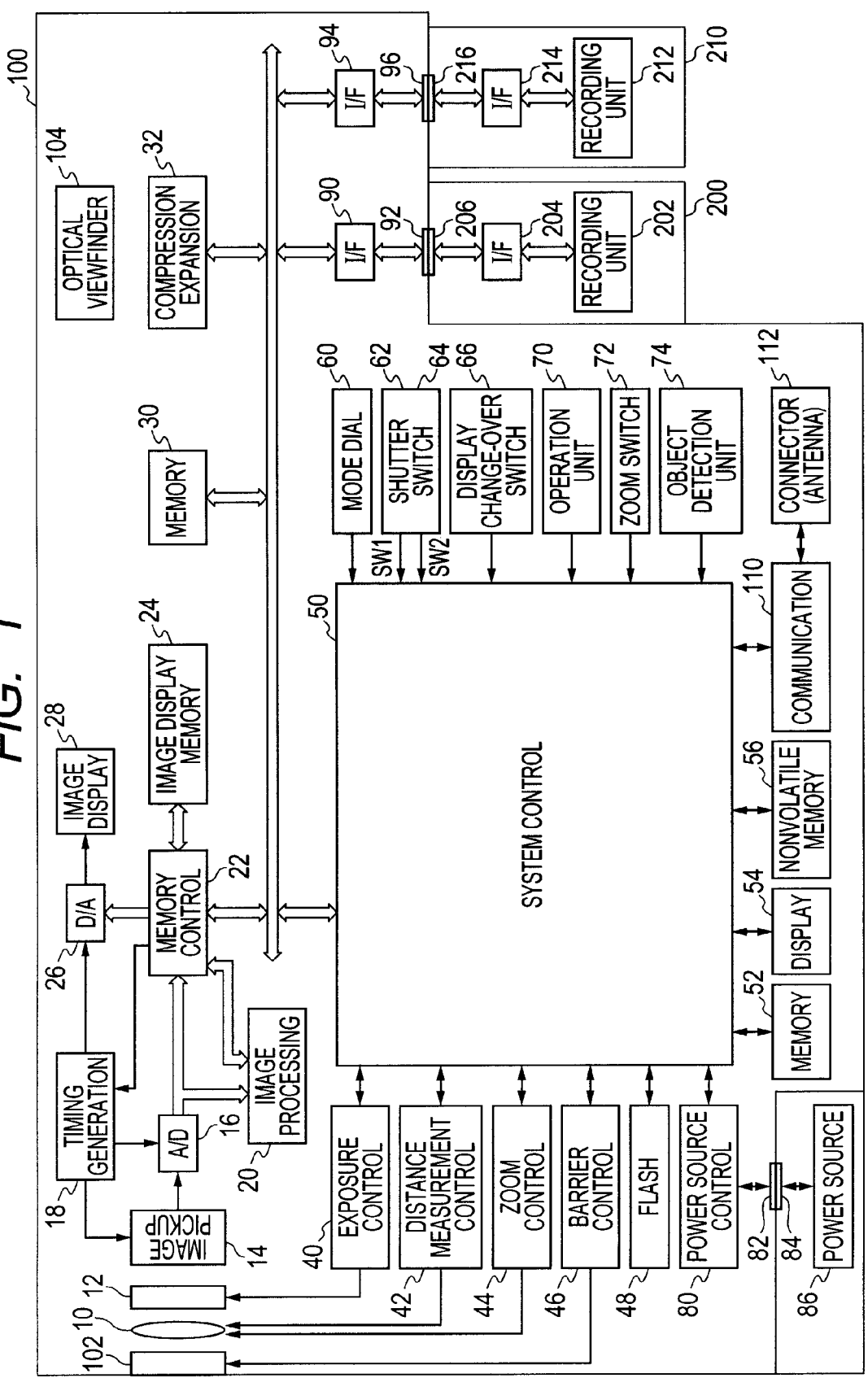
FIG. 1 is a block diagram of a digital camera according to an embodiment of the invention.

The embodiments relate to the embodiments of the case where an image processing apparatus of the invention is applied to a digital camera. FIG. 1 is a block diagram illustrating a construction of the digital camera.

In FIG. 1, an image processing apparatus 100 includes: a photographing lens 10; a mechanical shutter 12 having an iris function; an image pickup element 14 for converting an optical image into an electric signal; and an A/D converter 16 for converting an analog signal output of the image pickup element 14 into a digital signal. A timing generation circuit 18 supplies a clock signal and control signals to the image pickup element 14, the A/D converter 16, and a D/A converter 26. The timing generation circuit 18 is controlled by a memory control circuit 22 and a system control circuit 50. Besides the mechanical shutter 12, an electronic shutter which can control an accumulation time by controlling reset timing of the image pickup element 14 can be used for a moving image photographing or the like.

An image processing circuit 20 executes predetermined pixel interpolation processing and color conversion processing to data output from the A/D converter 16 and data output from the memory control circuit 22. By executing an image clipping and a magnification processing by the image processing circuit 20, an electronic zoom function is realized.

The image processing circuit 20 also executes an autofocus (AF) processing, an auto-exposure (AE) processing, and an exposure fusion (EF) processing of a Through-The-Lens (TTL) system. According to such a system, a predetermined arithmetic operation processing is executed by using picked-up image data and the system control circuit 50 controls an exposure control unit 40 and a distance measurement control unit 42 on the basis of an obtained arithmetic operation result.

Further, the image processing circuit 20 executes a predetermined arithmetic operation processing by using the picked-up image data and also executes an auto white balance (AWB) processing of the TTL system on the basis of the obtained arithmetic operation result.

The memory control circuit 22 controls the A/D converter 16, the timing generation circuit 18, the image processing circuit 20, an image display memory 24, the D/A converter 26, a memory 30, and a compression•expansion circuit 32.

The data of the A/D converter 16 is written into the image display memory 24 or memory 30 through the image processing circuit 20 and the memory control circuit 22. The data of the A/D converter 16 is directly written into the image display memory 24 or memory 30 through the memory control circuit 22.

The image display memory 24 and the D/A converter 26 are provided. An image display unit 28 is constructed by a thin film transistor (TFT) liquid crystal display (LCD), or the like.

The displaying image data written in the image display memory 24 is displayed by the image display unit 28 through the D/A converter 26.

If the picked-up image data is successively displayed by using the image display unit 28, an electronic viewfinder function can be realized.

The image display unit 28 can arbitrarily turns on/off the display by an instruction from the system control circuit 50. When the display is turned off, power consumption of the image processing apparatus 100 can be remarkably reduced.

The memory 30 is used to store the photographed still image and moving image and has a storage capacity enough to store a predetermined number of still images and the moving image of a predetermined time.

Thus, even in the case of such a continuous photographing that a plurality of still images are continuously photographed, or a panorama photographing, a large amount of images can be written into the memory 30 at a high speed.

The memory 30 can be also used as a work area of the system control circuit 50.

The compression•expansion circuit 32 compresses or expands the image data by an adaptive discrete cosine transform (ADCT) or the like. The compression•expansion circuit 32 reads the image stored in the memory 30, executes a compression processing or an expansion processing, and writes the processed data into the memory 30. The compression•expansion circuit can divide the moving image into slice areas and compression-encode them.

The exposure control unit 40 controls the shutter 12 having the iris function and also has a flash light emission adjustment function in association with a flash 48.

The distance measurement control unit 42 controls a focusing of the photographing lens 10. A zoom control unit 44 controls a zooming of the photographing lens 10. A barrier control unit 46 controls the operation of a protection unit 102 serving as a barrier.

The flash 48 also has a light projection function of AF fill light and a flash light emission adjustment function.

The exposure control unit 40 and the distance measurement control unit 42 are controlled by using the TTL system. On the basis of an arithmetic operation result obtained by arithmetically operating the picked-up image data by the image processing circuit 20, the system control circuit 50 controls the exposure control unit 40 and the distance measurement control unit 42.

The system control circuit 50 controls the whole image processing apparatus 100. A memory 52 stores constants, variables, a program, and the like for the operation of the system control circuit 50.

A display unit 54 is such as liquid crystal display apparatus, speaker, or the like for displaying or generating an operation state, a message, or the like by using characters, an image, a sound, or the like in accordance with an execution result of a program in the system control circuit 50. The display unit 54 is disposed at a visually recognizable position near the operation unit of the image processing apparatus 100 and is constructed by a combination of, for example, an LCD, LEDs, sound creation elements, and the like.

A part of the functions of the display unit 54 are provided in an optical viewfinder 104.

Among the contents which are displayed in the display unit 54, the following contents are displayed in the LCD or the like: a single shot/continuous shot display; a self timer display; a compression ratio display; a number-of-recording pixel display; a number-of-recording frame display; and a display of the number of remaining photographable frames. The following contents can be also displayed: a shutter speed display; an iris value display; an exposure correction display; a flash display; a red-eye relaxation display; and a macro photographing display. Besides them, the following contents can be also displayed: a buzzer setting display; a remaining battery capacity display; an error display; an information display expressed by a plural-figure number; a mount/unmount state of each of recording media 200 and 210; a communication I/F operation display; and the like.

Among the contents which are displayed in the display unit 54, the following contents are displayed in the optical viewfinder 104: an in-focus display; a camera shake warning display; a flash charging display; a shutter speed display; an iris value display; an exposure correction display; and the like.

For example, an EEPROM or the like is used as an electrically erasable•recordable nonvolatile memory 56.

Operation units 60, 62, 64, 66, 70, 72, and 74 are provided to input various kinds of operation instructions of the system control circuit 50. They are constructed by one or a combination of a plurality of devices such as switch, dial, touch panel, pointing device based on a view-point detection, voice recognition device, and the like.

Those operation units will be specifically described here.

The following function modes can be switched and set by a mode dial switch 60: a power source off; an auto-photographing mode; a photographing mode; a panorama photographing mode; a moving image photographing mode; a reproducing mode; a multi-picture reproduction•erasing mode; a PC connecting mode; a television receiving mode; and the like.

A shutter switch SW1 62 is turned on at the halfway operation of the shutter button and instructs to start the operation such as the AF processing, AE processing, AWB processing, EF (flash light pre-emission) processing, and the like.

A shutter switch SW2 64 is turned on upon completion of the shutter button operation and instructs to start the operation of a series of processings such as exposure processing, development processing, and recording processing. The exposure processing is a processing for transmitting the signal read out of the image pickup element 14 through the A/D converter 16 and the memory control circuit 22 and writing the obtained image data into the memory 30. The development processing is a processing based on the arithmetic operation in the image processing circuit 20 or the memory control circuit 22. The recording processing is a processing for reading out the image data from the memory 30, compressing it in the compression•expansion circuit 32, and writing the obtained image data into the recording medium 200 or 210.

A display change-over switch 66 can switch the display of the image display unit 28.

According to such a function, when the photographing is performed by using the optical viewfinder 104, power saving can be attained by shutting off the current supply to the image display unit comprising the TFT LCD, or the like.

An operation unit 70 is constructed by the following various kinds of buttons, touch panel, and the like: a menu button; a setting button; a macro button; a multi-picture reproduction page feeding button; a flash setting button; a single shot/continuous shot/self-timer change-over button; and the like. In addition to them, the following buttons are also provided: a menu move + (plus) button; a menu move − (minus) button; a reproduction image move + (plus) button; a reproduction image move − (minus) button; a photographing picture quality selecting button; an exposure correction button; a date/time setting button; and the like.

A zoom switch unit 72 is a zoom operation unit which is used for the user to instruct a magnification change of the picked-up image. The zoom switch unit 72 is also referred to as a zoom switch 72 hereinbelow. The zoom switch 72 is constructed by: a tele switch for changing an image pickup angle to a telephoto side; and a wide switch for changing the image pickup angle to a wide-angle side. This zoom switch 72 therefore is used as a trigger adapted to instruct the zoom control unit 44 to change the image pickup angle of the photographing lens 10 and execute the optical zooming operation. It is also used as a trigger adapted to electronically change the image pickup angle by an image clipping, a pixel interpolation processing, or the like by the image processing circuit 20. An object detection unit 74 is constructed by an element for detecting the object to be photographed or the like. A case of detecting a face is also considered as an object detection.

A power source control unit 80 is constructed by a battery detection circuit, a DC/DC converter, a switch circuit for switching a block to which a current is supplied, and the like. The power source control unit 80 detects the mount and unmount of a battery, a type of battery, and a remaining battery capacity. Based on a detection result and an instruction from the system control circuit 50, the power source control unit 80 controls the DC/DC converter and supplies a necessary voltage to each unit including the recording medium for a necessary period of time.

Connectors 82 and 84 are provided. A power source unit 86 is constructed by: a primary battery such as alkaline battery, lithium battery, or the like; a secondary battery such as NiCd battery, NiMH battery, Li battery, or the like; an AC adapter; and the like.

Interfaces 90 and 94 with the recording medium such as memory card, hard disk, or the like are provided. Connectors 92 and 96 are used to connect to the recording medium such as memory card, hard disk, or the like.

The embodiment will be described on the assumption that two sets of the interface and connector for attaching the recording medium are provided. Naturally, one or a plurality of sets of the interface and connector for attaching the recording medium may be provided. The interfaces of different standards and the connectors of different standards may be also combined and provided.

The interfaces and connectors which conform with the standard of an SD card, a compact flash (registered trademark) (CF) card, or the like may be used.

Further, as interfaces 90 and 94 and connectors 92 and 96, the interfaces and connectors which conform with the standard of a PCMCIA card, the CF (card, or the like may be used. That is, by connecting various kinds of communication cards, the image data and management information annexed to the image data can be mutually transferred to/from another computer or a peripheral such as a printer or the like. As communication cards, there are available a LAN card, a modem card, a USB card, an IEEE1394 card, an SCSI card, a PHS, and the like.

The protection unit 102 serving as a barrier covers the image pickup unit including the lens 10 of the image processing apparatus 100, thereby preventing a fouling or damage of the image pickup unit.

The photographing can be performed by using only the optical viewfinder 104 without using the electronic viewfinder function by the image display unit 28. The following part of the functions of the display unit 54 are provided in the optical viewfinder 104: for example, the in-focus display; the camera shake warning display; the flash charging display; the shutter speed display; the iris value display; the exposure correction display; and the like.

A communication unit 110 has various kinds of communicating functions such as USB, IEEE1394, LAN, wireless communication, and the like.

A connector or antenna (in the case of the wireless communication) 112 is provided to connect the image processing apparatus 100 to another apparatus by the communication unit 110.

The recording medium 200 is constructed by a memory card, a hard disk, or the like.

The recording medium 200 has: a recording unit 202 constructed by a semiconductor memory, a magnetic disk, or the like; an interface 204 for the image processing apparatus 100; and a connector 206 for connecting to the image processing apparatus 100.

The recording medium 210 is constructed by a memory card, a hard disk, or the like.

The recording medium 210 has: a recording unit 212 constructed by a semiconductor memory, a magnetic disk, or the like; an interface 214 for the image processing apparatus 100; and a connector 216 for connecting to the image processing apparatus 100.

Subsequently, an image process of the embodiment will be described with reference to a flowchart of FIG. 2. The image process is executed by a method whereby, for example, a CPU included in the system control circuit loads and executes a control program stored in the memory.

Figure 2:
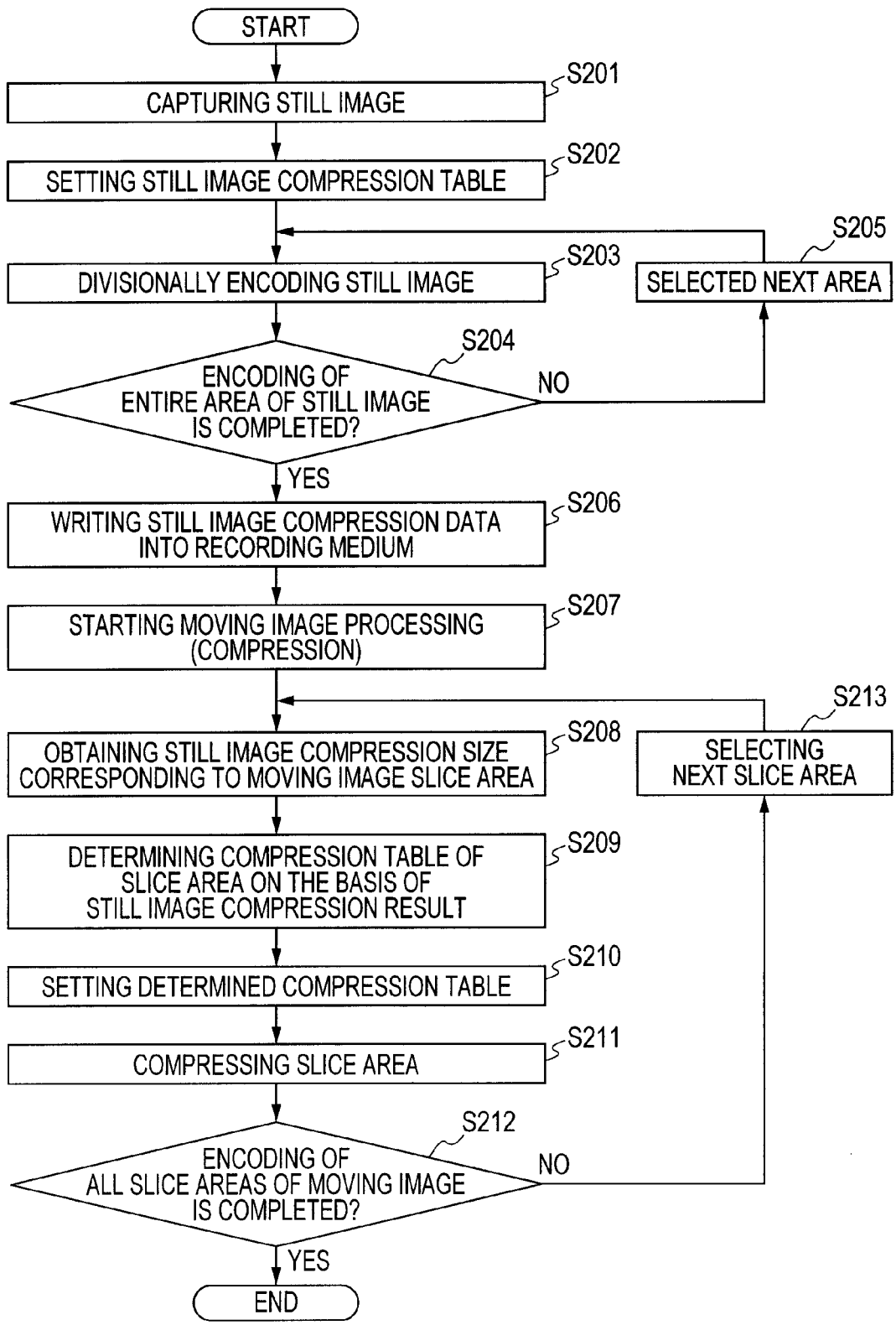
FIG. 2 is a flowchart for an image compression process according to the embodiment of the invention.
Figure 3:
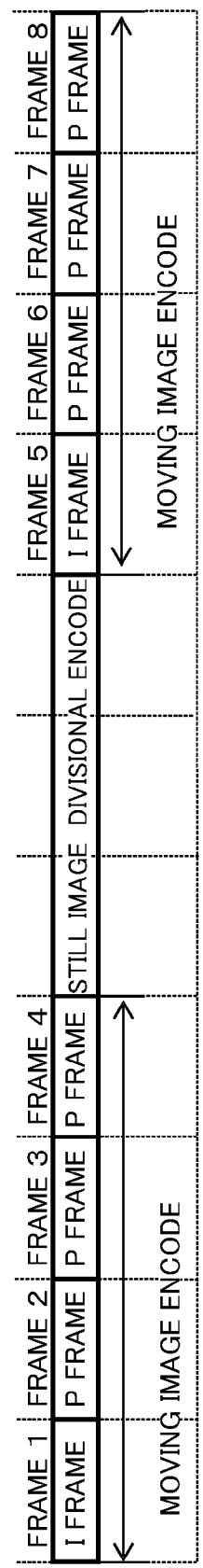
FIG. 3 is a diagram illustrating a frame sequence of a still image-in-moving image photographing according to the embodiment of the invention.

FIG. 2 illustrates the flowchart for the image processing which is executed during a time period from the still image photographing in a photographing sequence of the still image-in-moving image up to encoding of I frame as a head frame (frame 5 in FIG. 3) of the subsequent moving image photographing. FIG. 3 illustrates an example of the sequence of the still image-in-moving image photographing to which the image process is applied. In the sequence of the still image-in-moving image photographing illustrated in FIG. 3, the image process from the divisional encoding of the still image (still image compression control) up to the frame 5 of the moving image (moving image compression control) is executed in accordance with the flowchart of FIG. 2.

First, the still image is photographed in step S201, and step S202 follows to set a compression table of the still image. Subsequently, in step S203, the still image data is divisionally encoded. To divisionally encode it, a still image area is divided in correspondence to a slice of the moving image. FIGS. 4A and 4B illustrate an example of a dividing method upon divisional encoding. FIG. 4A illustrates divided areas of the still image and FIG. 4B illustrates slice areas of the moving image, respectively. If the object of the moving image and the object of the still image are the same as in the case of the still image-in-moving image photographing, the same object is photographed in each of an area where divided areas A1 and A2 of the still image are combined and a slice area B1 of the moving image. Similarly, an area where divided areas A3 and A4 are combined corresponds to a slice area B2 of the moving image. An area where divided areas A5 and A6 are combined corresponds to a slice area B3. An area where divided areas A7 and A8 are combined corresponds to a slice area B4. The dividing method of the still image is not limited to that illustrated in FIG. 4A but another method may be used so long as a correspondence relation between the divided areas of the still image and the slice areas of the moving image is attained.

In the still image divisional encoding, first, in step S203, the still image area of the divided areas A1 and A2 corresponding to the slice area B1 of the moving image is encoded by using the compression table set for the still image. Subsequently, step S204 follows to discriminate whether or not the compression of the entire area of the still image has been completed. Since it is not completed yet at this stage, step S205 follows To select the next divided areas, that is, A3 and A4 corresponding to the slice area B2. Those areas are compressed in step S203. Similarly, the encode processing of the still image data is repeated until the divided areas A7 and A8 corresponding to the slice area B4 of the moving image are compressed.

If it is determined in step S204 that the compression of all of the divided areas has been completed, step S206 follows to record the compressed still image data into the recording medium 200. Subsequently, step S207 follows to start the encoding of an I frame of the moving image immediately after the still image photographing of the still image-in-moving image.

First, in step S208, a compressed data amount of the still image corresponding to the slice area B1 in FIGS. 4A and 4B is calculated. The divided areas of the still image corresponding to the slice area B1 in FIGS. 4A and 4B are A1 and A2. Assuming that a compressed data amount of the still image of A1 is equal to "a" and a compressed data amount of the still image of A2 is equal to "b", a still image compressed data amount corresponding to the slice area B1 in FIGS. 4A and 4B is equal to (a+b). After that, step S209 follows to determine a compression table of the slice area B1 in FIGS. 4A and 4B on the basis of the still image compressed data amount calculated in step S208.

An example of a deciding method of the compression table will be described with reference to FIG. 5. According to the method illustrated in the diagram, k is assumed to be a reference value and a result obtained by weighting k by a predetermined coefficient is compared with the still image compressed data amount calculated in step S208, thereby deciding the compression table which is to be used. For example, in the case of decision of the compression table of the slice area B1, first, the addition result (a+b) of the compressed data amount "a" of the divided area A1 and the compressed data amount "b" of the divided area A2 is compared with the reference value k×0.5. If the comparison shows that (a+b) is smaller, then the compression table of Q1 is used. If (a+b) is equal to or larger than k×0.5, it is compared with k×0.8. Thus, if it is decided that (a+b) is smaller, the compression table of Q2 is used. In this manner, the compression table is determined in accordance with the method illustrated in FIG. 5. The compression tables are defined in order of high compression ratios of Q5, Q4, Q3, Q2, and Q1, so that if the compressed data amount of the still image is large, then the compression ratio of the moving image data is raised. Thus, the moving image compressed data amount can be constant over each slice area. The reference value k can be properly set in consideration of a target code amount or the like. A plurality of reference values may be selectively set and used in correspondence to a feature of the image (scene).

Once the compression table of the slice area B1 of the moving image is determined, this table is set in step S210. Subsequently, step S211 follows to compress the slice area B1 by using the set compression table (slice-compression). After that, whether or not the compression of all slice areas of the moving image of one frame has been completed is discriminated in step S212. If it is decided that the compression is not completed yet, the processing routine is returned to step S208 through step S213. The compression table of the next slice area (B2 in this case) is determined and the compression is performed. A similar processing is also repeated with respect to other slice areas. When the compression of all of the slice areas of one frame is completed, the process is ended.

The compression ratio of the frame of the moving image photographed immediately after still image photographing is determined every slice from the photographed still image in this manner, so that even in the case of the head frame of the moving image, the compressed data amount can be adjusted.

Although the embodiment of the invention has been described with respect to the still image-in-moving image, the invention may be embodied in a function such that the moving image is photographed after the still image was photographed. In this case, whether or not the compression table of the moving image is decided based on a compression result of the still image may be determined in accordance with a photographing condition. For example, in the case where the scene is discriminated to decide that the object is moving or in the case where an interval between the photography of a still image and photography of the next photographed moving image is equal to or longer than a specified time, the compression table of the moving image is not decided from the still image compression result, or the like.

Although the invention has been described in detail above on the basis of the exemplary embodiments, the invention is not limited to those specific embodiments but various modifications in a range without departing from the essence of the invention are also incorporated in the invention. A part of the foregoing embodiments may be properly combined.

For example, although the embodiment has been described with respect to case, as an example, where the image processing apparatus of the invention is applied to the digital camera having the still image-in-moving image photographing mode, the invention is not limited to it. The invention can be applied to any apparatus so long as it needs the compression processings of the moving image and the still image obtained by photographing the same object. In this case, by adding a condition as to whether or not the image process of the invention is applied as mentioned above, the invention can be more effectively embodied.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-086734, filed Apr. 5, 2010, which is hereby incorporated by reference herein in its entirety.

What is claimed is:

1. An image processing apparatus comprising:
    an obtaining unit configured to obtain still image data and moving image data;
    a still image compressing unit configured to compress the still image data;
    a moving image compressing unit configured to divide the moving image data into first divided areas and compress the moving image data of each of the first divided areas in each frame;

a still image compression control unit configured to divide the still image data into second divided areas so that the second divided areas correspond to the first divided areas and compress the still image data of each of the second divided areas by the still image compressing unit; and a moving image compression control unit configured to decide a compression table of each of the first divided areas on the basis of a compression result of the still image data of the second divided area which corresponds to the each of the first divided areas, and compress the moving image data of the each of the first divided areas by the moving image compressing unit by using the decided compression table.

2. An apparatus according to claim 1, wherein the still image data and the moving image data are data of the still image and the moving image which were photographed by a still image-in-moving image photographing, and the moving image compression control unit controls the first divided area of the frame of the moving image photographed subsequently to the photographed still image.

3. An apparatus according to claim 1, wherein the frame of the moving image is a frame of the moving image photographed immediately after the photographed still image.

4. An apparatus according to claim 1, wherein the compression result of the still image data of each of the second divided areas is a compressed data amount, and the moving image compression control unit discriminates a value of the compressed data amount and decides the compression table to be used from among a plurality of compression tables.

5. An apparatus according to claim 1, further comprising a discriminating unit configured to discriminate whether or not the determination of the compression table is made on the basis of a photographing condition, and wherein a slice compression of the moving image data is controlled in accordance with a discrimination result of the discriminating unit.

6. A photographing apparatus comprising:

a photographing unit configured to photograph an object to obtain still image data and moving image data;

a still image compressing unit configured to compress the still image data;

a moving image compressing unit configured to divide the moving image data into first divided areas and compress the moving image data of each of the first divided areas in each frame;

a still image compression control unit configured to divide the still image data into second divided areas so that the second divided areas correspond to the first divided areas and compress the still image data of each of the second divided areas by the still image compressing unit;

a moving image compression control unit configured to decide a compression table of each of the first divided areas on the basis of a compression result of the still image data of the second divided area which corresponds to the each of the first divided areas, and compress the moving image data of the each of the first divided areas by the moving image compressing unit by using the decided compression table; and a recording unit configured to record the still image data generated by the still image compressing unit and the moving image data generated by the moving image compressing unit.

7. A control method of an image processing apparatus having a still image compressing unit configured to compress still image data and a moving image compressing unit configured to slice-compress moving image data, comprising:

obtaining the still image data and the moving image data;

dividing the moving image data into first divided areas and compressing the moving image data of each of the first divided areas in each frame;

dividing the still image data into second divided areas so that the second divided areas correspond to the first divided areas and compressing the still image data of each of the second divided areas by the still image compressing unit; and deciding a compression table of each of the first divided areas on the basis of a compression result of the still image data of the second divided area which corresponds to the each of the first divided areas, and compressing the moving image data of the each of the first divided areas by the moving image compressing unit by using the decided compression table.

8. A non-transitory computer-readable storage medium storing a program comprising a code for causing a computer to execute the control method according to claim 7.

* * * * *